G. M. HUSTON.
VEHICLE SPRING EQUALIZER.
APPLICATION FILED MAY 31, 1913.
1,073,804.
Patented Sept. 23, 1913.
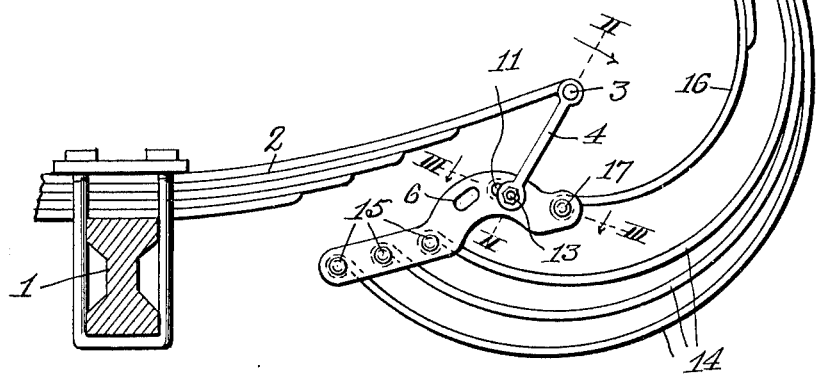
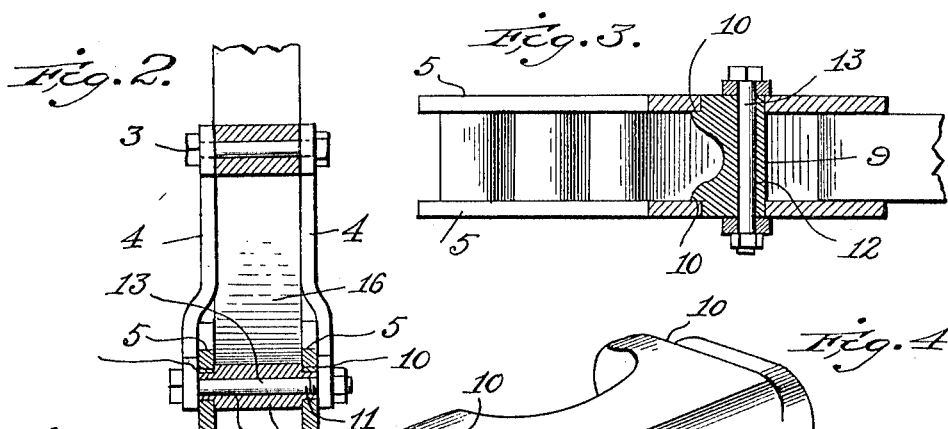
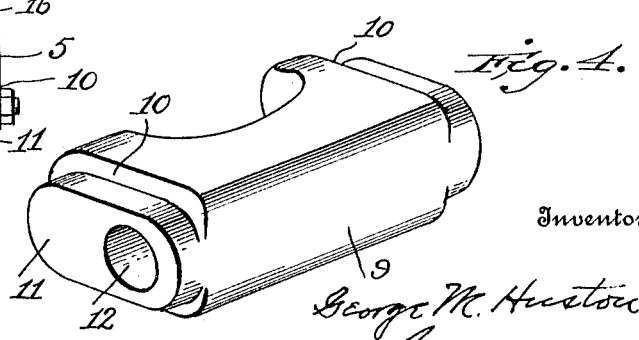
Inventor
George M. Huston
By Percy B. Hills
Attorney

UNITED STATES PATENT OFFICE.

GEORGE M. HUSTON, OF NEW YORK, N. Y.

VEHICLE SPRING-EQUALIZER.

1,073,804.

Specification of Letters Patent.

Patented Sept. 23, 1913.

Application filed May 31, 1913. Serial No. 771,029.

*To all whom it may concern:*

Be it known that I, GEORGE M. HUSTON, a citizen of the United States, residing at New York, in the county of New York and State of New York, have invented certain new and useful Improvements in Vehicle Spring-Equalizers; and I do hereby declare the following to be a full, clear, and exact description of the invention, such as will enable others skilled in the art to which it appertains to make and use the same.

My invention relates to vehicle springs, and has for its object to provide certain improvements in the type of spring disclosed in Letters Patent No. 1,036,247, granted to me August 20, 1912, and as disclosed in certain other Letters Patent also granted to me, the primary object of said improvement being to provide a novel form of equalizer for connecting the ends of the spring leaves with the leaf spring, disclosed in said Letters Patent.

In the accompanying drawing: Figure 1 is a side elevation of my improved construction shown applied to a vehicle axle and body, said axle being shown in section; Fig. 2 is a detail sectional view on the line II—II, Fig. 1; Fig. 3 is a similar view on the line III—III, Fig. 1; Fig. 4 is an enlarged detail perspective view of the spacing block or bushing employed; Fig. 5 is a detail side elevation of one member of the equalizer.

In the said drawing, the reference numeral 1 denotes one of the axles of an automobile or other vehicle, the same being shown I-shaped in cross section, although it may be of any configuration. Bolted to said axle is a leaf spring 2 formed of any desired number of leaves, and projecting equidistant transversely to each side of the axle 1, though but one of said sides is herein shown. Pivotally connected at 3 to the free end of said spring is a rigid bar or shackle 4, said bar or shackle being pivoted, in a manner hereinafter described, to the two members 5 of an equalizer. Said equalizer, as stated, is composed of two similarly shaped members 5 disposed in parallel relation, each of the same being provided with a single aperture 7 near one end and with a plurality of apertures 8 along its opposite end, all of said apertures registering with the similar apertures in the companion equalizer plate. Shaped to fit in either of the elongated apertures 6 is a spacing block or bushing 9 formed preferably of cast metal, and being provided with shoulders 10 against which the members 5 of the equalizer will contact to space the same the proper distance apart, the bushing 9 projecting at 11 through the apertures 6 in said equalizer members. Said bushing is bored eccentrically at 12 to receive the bolt 13 by which connection is made with the rigid bar or shackle 4, as shown. It will be observed that when it is desired to shift the point of connection between said shackle 4 and the equalizer a slight shift may be obtained by removing and reversing the bushing 9 to bring the bolt-hole 12 to the left. A still greater shift may be obtained by shifting said bushing bodily to the rearmost elongated apertures 6, and a like minor variation in adjustment may be obtained within said apertures by reversing said bushing, as will readily be understood.

In use, the free ends of the spring leaves 14, which are similar in construction to those disclosed in Letters Patent No. 1,036,247, hereinbefore referred to, are connected to the members of the equalizer at the points 15, while the innermost leaf 16 is connected to said equalizer on the opposite side of the bar or shackle 4 at 17. It will be observed that the bushing 9 by serving as a spacing member for the members 5 of the equalizer, prevents the latter from binding upon the ends of the spring leaves 14 and 16, leaving them free to turn upon their connections 15 and 17. By means of the adjustment provided for the connection between the bar or shackle 4 and the equalizer, through the bushing 9 and the apertures 6, I am enabled accurately to adjust the tension of the springs 14 and 16, it being apparent that the nearer the point of connection is to the point of connection 17 of spring leaf 16 the more flexible will be the action of the device as a whole. By means of this adjustment I am enabled, therefore, to suit the spring to vehicles adapted to carry from two to seven persons.

Having thus described my invention, what I claim as new and desire to secure by Letters Patent is:

1. In combination with a plurality of similarly curved spring leaves fixed to one member in contact with each other and gradually separating toward their other ends, a leaf spring fixed to the other member, a bar or shackle pivoted to the free end of said leaf spring, and an equalizer adjustably connected intermediate its length with the other end of said bar or shackle and also connected on opposite sides of the point of connection with said bar or shackle with the free end of said spring leaves.

2. In combination with a plurality of similarly curved spring leaves fixed to one member in contact with each other and gradually separating toward their other ends, a spring fixed to the other member, a bar or shackle pivoted to the free end of said spring, and an equalizer formed of similar oppositely disposed plates connected and spaced by a bolt receiving bushing to which the other end of said bar or shackle is pivoted, the free ends of said spring leaves being also connected to said equalizer between the spaced members thereof.

3. The combination with an equalizer having an elongated aperture therein, of a removable and reversible bolt receiving bushing shaped to fit said elongated aperture and having an eccentrically disposed bolt receiving bore therethrough.

4. The combination with an equalizer formed of two similarly shaped members having coinciding elongated apertures therein, of a bolt receiving bushing formed with shoulders to space apart said equalizer members and with ends adapted to pass through said elongated apertures therein and having an eccentrically disposed bolt receiving bore therethrough.

In testimony whereof I affix my signature in the presence of two subscribing witnesses.

GEORGE M. HUSTON.

Witnesses:
CHARLES LOWELL HOWARD,
PERCY B. HILLS.

---

Copies of this patent may be obtained for five cents each, by addressing the "Commissioner of Patents, Washington, D. C."